United States Patent
Krumrine et al.

(10) Patent No.: US 10,309,204 B2
(45) Date of Patent: Jun. 4, 2019

(54) USE OF ALKALI METAL SILICIDES IN POST-CHOPS OILFIELD RECOVERY OPERATIONS

(71) Applicant: SIGNA CHEMISTRY, INC., New York, NY (US)

(72) Inventors: Paul H. Krumrine, Hanover, PA (US); Michael Lefenfeld, New York, NY (US); Gregory Arthur Romney, Coeur D'Alene, ID (US); Muhammad Imran, Regina (CA); Kelvin Dean Knorr, Regina (CA)

(73) Assignee: SIGNA CHEMISTRY, INC., New York, NY (US)

( * ) Notice: Subject to any disclaimer, the term of this patent is extended or adjusted under 35 U.S.C. 154(b) by 0 days.

(21) Appl. No.: 15/028,152

(22) PCT Filed: Oct. 17, 2014

(86) PCT No.: PCT/US2014/061265
§ 371 (c)(1),
(2) Date: Apr. 8, 2016

(87) PCT Pub. No.: WO2015/058164
PCT Pub. Date: Apr. 23, 2015

(65) Prior Publication Data
US 2016/0245060 A1    Aug. 25, 2016

Related U.S. Application Data

(60) Provisional application No. 61/892,222, filed on Oct. 17, 2013.

(51) Int. Cl.
*E21B 43/25* (2006.01)
*E21B 43/16* (2006.01)
(Continued)

(52) U.S. Cl.
CPC .............. *E21B 43/25* (2013.01); *C09K 8/58* (2013.01); *C09K 8/592* (2013.01); *C09K 8/594* (2013.01);
(Continued)

(58) Field of Classification Search
CPC .......... E21B 43/25; E21B 43/16; E21B 43/24; E21B 43/255; C09K 8/58; C09K 8/592; C09K 8/594
See application file for complete search history.

(56) References Cited

U.S. PATENT DOCUMENTS 7,811,541 B2   10/2010  Lefenfeld et al.
8,053,397 B2 *  11/2011  Huang ............... C09K 8/44
                                                       166/279

(Continued)

FOREIGN PATENT DOCUMENTS

| CA | 2761048 A1 | 3/2012 |
| RU | 2346971 C2 | 2/2009 |
| WO | 2012/174255 A1 | 12/2012 |

OTHER PUBLICATIONS

International Search Report and Written Opinion in corresponding International Application No. PCT/US2014/061265, dated Feb. 5, 2015.

(Continued)

*Primary Examiner* — Silvana C Runyan
(74) *Attorney, Agent, or Firm* — J.A. LINDEMAN & CO., PLLC

(57) ABSTRACT

Methods of stimulating enhanced oil recovery from a post-cold heavy oil production with sand ("CHOPS") oil-bearing formation are disclosed. The invention relates to a method of stimulating oil recovery from a post-cold heavy oil production with sand (CHOPS) oil-bearing formation. The method optionally flushes a wellbore in a post-CHOPS oil-bearing formation having at least one worm hole to expel water from (Continued)

the wellbore and near wellbore region; then injects a alkali metal silicide into the post-oil-bearing formation via a wellbore to introduce the alkali metal silicide into at least one worm hole within the post-oil-bearing formation. The injection step is followed by reacting the injected alkali metal silicide to stimulate oil flow within the post-CHOPS oil-bearing formation; and recovering oil from the post-CHOPS oil-bearing formation. The alkali metal silicide dispersion can also be injected into the formation in a cyclic mode of alternating injection, soak, and production periods.

16 Claims, 8 Drawing Sheets

(51) Int. Cl.
*C09K 8/592* (2006.01)
*E21B 43/24* (2006.01)
*C09K 8/58* (2006.01)
*C09K 8/594* (2006.01)

(52) U.S. Cl.
CPC .............. *E21B 43/16* (2013.01); *E21B 43/24* (2013.01); *E21B 43/255* (2013.01)

(56) References Cited

U.S. PATENT DOCUMENTS

| | | | |
|---|---|---|---|
| 8,685,902 B2 | 4/2014 | Pershikova et al. | |
| 8,962,536 B2 | 2/2015 | Winslow et al. | |
| 9,494,012 B2* | 11/2016 | Falcone | C09K 8/58 |
| 2012/0037368 A1* | 2/2012 | Eick | C09K 8/516 |
| | | | 166/300 |
| 2013/0341023 A1* | 12/2013 | Krumrine, III | E21B 43/267 |
| | | | 166/280.1 |
| 2014/0196896 A1* | 7/2014 | Krumrine | C09K 8/58 |
| | | | 166/270.1 |

OTHER PUBLICATIONS

International Preliminary Report on Patentability in corresponding International Application No. PCT/US2014/061265, dated Apr. 28, 2016.

* cited by examiner

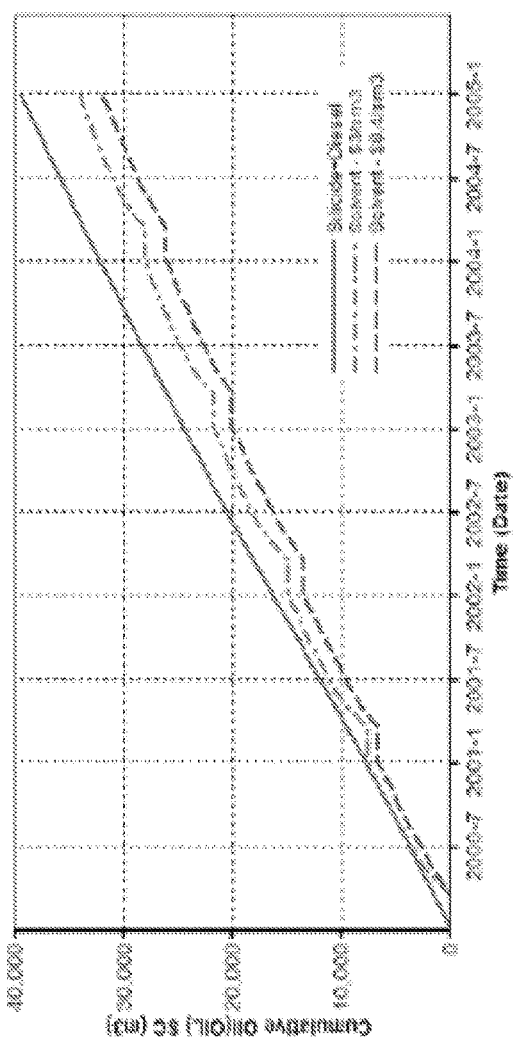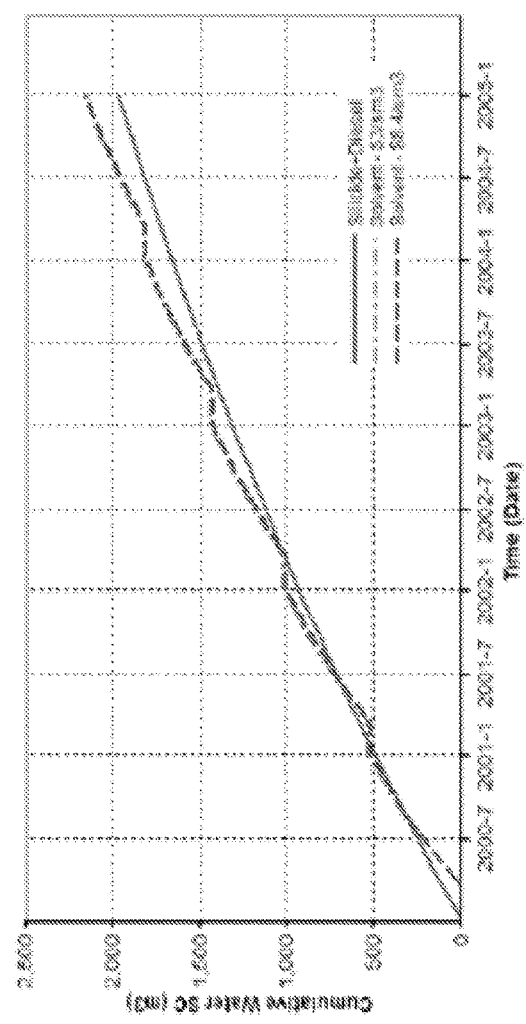

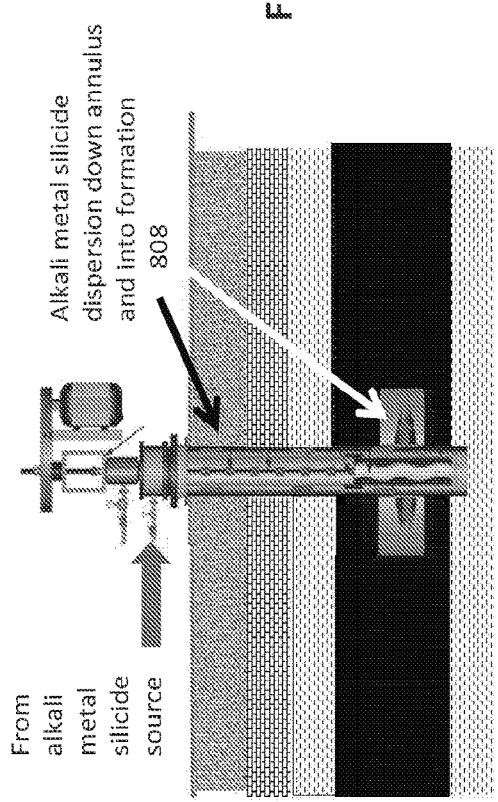
Figure 6A  Huff (injection phase)
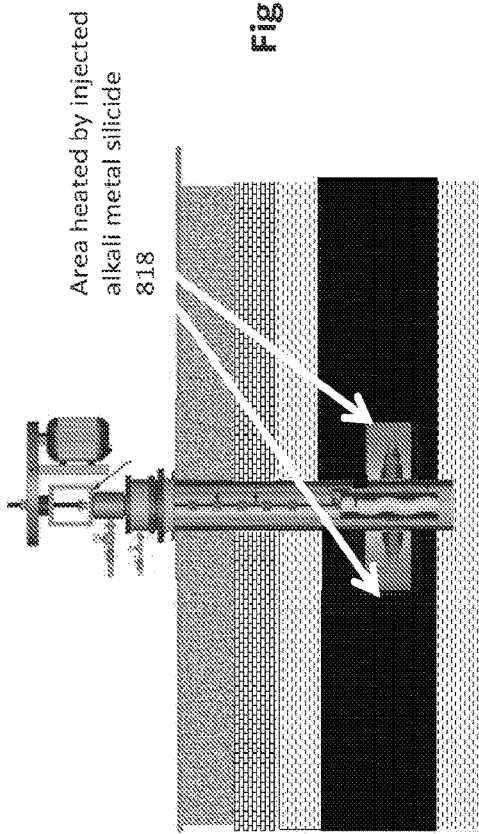
Figure 6B  Soak (dissipating heat)

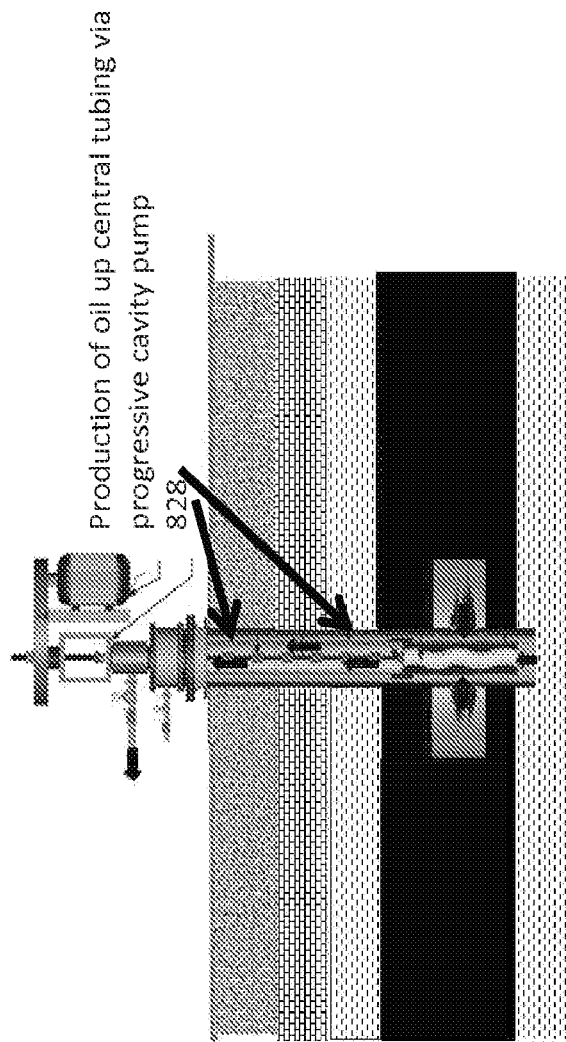
Figure 6C   Puff (production phase)

USE OF ALKALI METAL SILICIDES IN POST-CHOPS OILFIELD RECOVERY OPERATIONS

CROSS-REFERENCE TO RELATED APPLICATION

This application claims priority to U.S. Provisional Patent Application No. 61/892,222 filed on Oct. 17, 2013, the entire contents of which are incorporated by reference in this application.

TECHNICAL FIELD

This invention relates to alkali metal silicide systems and techniques for improving recovery and increasing the amount of crude oil that can be extracted from a post-CHOPS (cold heavy oil production with sand) oil-bearing formation.

BACKGROUND

Oil Field Background

In hydrocarbon deposits, such as heavy oil and bitumen containing reservoirs, a significant fraction of the hydrocarbon resource is unrecoverable by current methods, including primary production and secondary water flood techniques. These existing recovery techniques access only a small portion of known heavy crude reserves, with the balance remaining trapped underground. This is particularly true for the heavier crudes and bitumens in the 10 to 22 degree API (American Petroleum Institute gravity) category, where the viscosity of the hydrocarbon deposits can range to several hundred poise, or greater. In particular, these heavier crudes are difficult to displace from the porous matrix (formation) toward a production well with water-based fluids due to viscous fingering (unstable liquid interface) and the unfavorable mobility ratio, making simple water flooding a non-viable option.

Cold Heavy Oil Production with Sand (CHOPS) technology has been used to recover heavy crudes from relatively thin unconsolidated oil sands. CHOPS is a non-thermal process where both sand and oil are produced simultaneously under primary conditions. The increased sand production leads to higher levels of oil production as well. Typical CHOPS recovery factors are only 5 to 15% of the original oil in place leaving significant reserves in place and major parts of the reservoir unproduced. As a result of producing sand from these reservoirs and formations, extremely high permeability pathways ("wormholes") are generated in the oil producing formations. While it has been shown that in many cases these wormholes are open channels of up to several centimeters in diameter that can extend hundreds of meters into the formation, in other cases wormholes after primary oil production has ceased, may fill, collapse and/or regrow into a network of open channels and disturbed areas of high porosity and permeability. Wormholes can be a dynamic phenomenon. As sand production continues, the wormholes grow larger and longer extending deeper into the reservoir. Consequently, the existence of wormholes in a post-CHOPS oil-bearing formation makes application of most subsequent enhanced recovery techniques technically difficult, high risk, uneconomical or even impossible.

Following primary CHOPS production, additional flooding or other secondary techniques are often ineffective as water, or other fluids, and gases readily bypass the heavy oil as it follows the wormhole pathways within the post-CHOPS oil-bearing formation. Injected fluids then quickly breakthrough the formation during a flood because of the adverse mobility contrast between water and heavy oil.

Many techniques have been proposed and attempted for improving oil recovery efficiency, but large volumes of hydrocarbons remain in oil-rich formations even after secondary recovery efforts. One factor causing retention of the hydrocarbons in the formations is the inability to direct sufficient pressure on the hydrocarbon droplets residing in the pore spaces of the matrix oil formation to promote flow to the production well. Still, the increasing value of oil and increased demand has created a greater need for enhanced oil recovery methods to revitalize older wells, including those that have been abandoned due to a high ratio of water compared to the volume of total oil produced (water cut).

Enhanced oil recovery encourages the flow of previously trapped oil by effectively increasing the relative permeability of the oil embedded in the formation and by reducing the viscosity and surface tension of the oil. Numerous enhanced oil recovery technologies are currently practiced in the field including those involving thermodynamic, chemical, and mechanical processes. Heating the oil with steam often reduces the viscosity of the trapped oil, provided there is ready access to steam energy and heat losses can be managed. In CHOPS, steam is ineffective due to the oil zone being relatively thin and the heat transfer is too challenged.

Various EOR techniques have been explored to improve the recovery of oil after primary CHOPS production. Attempts have been made to utilize downhole steam generators to apply heat to post-CHOPS production in a flooding situation to reduce crude oil viscosity and to improve flow so the heavy oil can be driven to a (second) collection well. Microwave devices in horizontal CHOPS wells have been used to heat up the formation and to reduce viscosity to improve mobility of heavy oils. Further, microbial techniques have also been used to generate biogas, methane or $CO_2$, to re-pressurize parts of a CHOPS well and thereby solubilize the gases into the heavy crude to lower viscosity and to provide drive energy for production. Solvent and solvent-steam injection EOR techniques has also been used to repressure post CHOPS reservoirs, lower viscosity, improve sweep and recovery. None of these techniques however provide a universal economical solution or have gained wide spread use. Other techniques are needed to add to the oil recovery tool box. A need exists, therefore, to have an effective way to recover oil from post-CHOPS oil-bearing formations.

SUMMARY OF THE INVENTION

The invention relates to a method of stimulating additional oil recovery from a post-cold heavy oil production with sand (CHOPS) well in an oil-bearing formation. The method optionally flushes a wellbore in a post-CHOPS oil-bearing formation having at least one wormhole to expel water from the wellbore; then injects an alkali metal silicide into the post-CHOPS oil-bearing formation via a wellbore to introduce the alkali metal silicide into at least one wormhole within the post-CHOPS oil-bearing formation. The injection step is followed by reacting the injected alkali metal silicide with water to stimulate oil flow within the post-CHOPS oil-bearing formation; and recovering oil from the post-CHOPS oil-bearing formation. In one embodiment, the injecting and reacting steps are repeated in a cyclical manner to stimulate oil flow within the post-CHOPS oil-bearing formation.

BRIEF DESCRIPTION OF THE DRAWINGS

FIGS. 5A and 5B show comparative case examples for alkali metal silicide vs solvent, showing oil and water production.

FIGS. 6A-6C show an example alkali metal silicide injection methodology using a cyclic huff and puff stimulation with injection and production using the same well.

DETAILED DESCRIPTION

Figure 1:
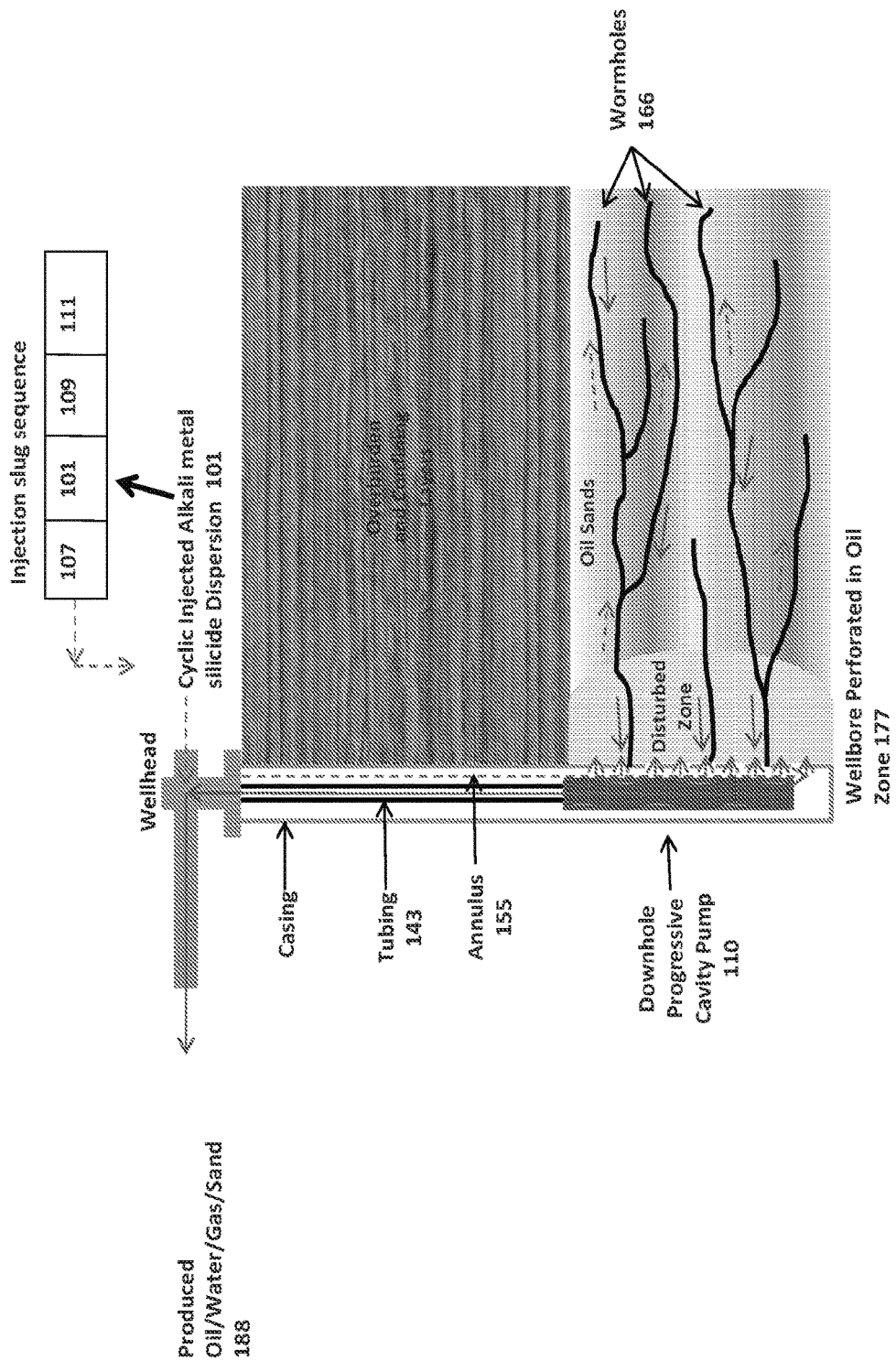
FIG. 1 depicts a typical post-CHOPS well with developed wormholes for injecting an alkali metal silicide dispersion and production of oil/water/gas/sand under cyclic operation.

Cold Heavy Oil Production with Sand (CHOPS)

Oil fields containing relatively thin layers of heavy oil in unconsolidated sandstone formations have been produced under primary production via a method that is commonly referred to as CHOPS, Cold Heavy Oil Production with Sand. The thin hydrocarbon-containing layers render steam flooding a non-viable option due to high heat losses to non-productive confining layers above and below. The crude oil is most effectively produced with progressive cavity pumps by allowing the sand to be produced concurrently with the oil and gas. Through a solution gas drive/pressure depletion mechanism, in some cases with contributing aquifer pressure support, a combination of foamy oil, gas, water, and sand are produced until the oil production tails off over time and water production increases to the point where it becomes uneconomical to continue production. At this point, the wells are generally suspended after only producing between 5 to 15% of the oil that was originally in place with an average of around 5% recovery. It is estimated there may be as many as 30,000 of these suspended CHOPS wells in Canada alone.

Oil Recovery from Post-CHOPS Oil-Bearing Formations

The invention relates to a method of stimulating additional oil recovery from a post-cold heavy oil production with sand (CHOPS) well in an oil-bearing formation. The method optionally flushes a wellbore in a post-CHOPS oil-bearing formation having at least one wormhole to expel water from the wellbore; then injects a alkali metal silicide into the post-CHOPS oil-bearing formation via a wellbore to introduce the alkali metal silicide into at least one wormhole within the post-CHOPS oil-bearing formation. The injection step is followed by reacting the injected alkali metal silicide with water to stimulate oil flow within the post-CHOPS oil-bearing formation; and recovering oil from the post-CHOPS oil-bearing formation. The various aspects and embodiments of the invention are described below.

CHOPS oil production results in the formation of wormholes in the unconsolidated sand matrix. These relatively-open, highly-porous channels, or conduits, where the sand has been removed—in addition to the halo of disturbed sand surrounding them—are beneficial during (primary) CHOPS production to facilitate the flow of the oil, water, gas, and sand mixture. These wormholes can be as large as 10 cm and can extend hundreds of meters into the formation. These wormholes, however, are often detrimental to subsequent secondary or tertiary recovery techniques, since they bypass large portions of the reservoir and lead to early water breakthrough, thereby severely degrading intended flooding sequences to improve sweep and promote contact with the more virgin areas of the formation. In the methods of the invention, these same wormholes can provide a high permeability pathway deep into the formation for introduction of the alkali metal silicide material that would not be readily injectable into the virgin formation. Sufficient quantities of alkali metal silicide can be injected into the wormholes of heavy oil formations and reacted with present in situ water, or injected water or alcohol. The reaction provides additional energy and conditions to push more oil toward the production well.

Alkali metal silicides, such as disclosed in US published application no. 2014/0196,896 A1 (which is incorporated herein by reference in its entirety), when used as an enhanced oil recovery (EOR) agent, have properties that leverage the benefits of chemical, immiscible gas, and thermal flooding techniques. Alkali metal silicides provide superior hydrogen generation and heat release compared to other water-reactive chemicals. Alkali metal silicides can be used at any depth since the only limiting factor is the availability of water. When delivered downhole, either as time-delayed water-resistant coated solid or via a hydrocarbon carrier fluid dispersion, the reaction heat is generated in situ at the point of reaction upon contact with formation water and is not lost at the surface or to the well string during transit to the formation as in other EOR techniques. Alkali silicate reaction products are also generated at the reaction point so they can be propagated deeper into higher temperature formations to alter wettability, and to create surfactants to lower interfacial tension (IFT) of the crude oil before being consumed. The lower IFT and altered wettability promote oil recovery. The reaction products of alkali metal silicide, heat, hydrogen, and alkali silicate, represent a "green" chemistry approach that can reduce the environmental impact of oil recovery operations.

The invention utilizes an alkali metal silicide (such as disclosed in U.S. Pat. No. 7,811,541, which is hereby incorporated by reference in its entirety for all purposes) that rapidly produces significant amounts of heat, hydrogen gas, and an alkali metal silicate solution upon contact with water. The combination of reaction products provides great flexibility for the enhancement of crude oil recovery processes. Example embodiments of the claimed invention utilize alkali metal silicides of the alkali metal group consisting of lithium (Li), sodium (Na) and potassium (K). For example, several example compositions including lithium alkali metal silicide ($Li_{12}Si_7$), sodium silicide ($Na_4Si_4$), and potassium silicide ($K_4Si_4$) among others can be utilized in methods of the invention. Upon reaction with water, an alkali metal silicide produces an alkali metal silicate, hydrogen gas, and heat. Although the remainder of the discussion focuses on systems and methods of the sodium forms of the alkali metal silicide composition as illustrative examples, other versions of alkali metal silicides (as well as other metal versions of silicide) can also be used effectively in the invention with post-CHOPS oil-bearing formations field applications and are included in the scope of the claimed invention. Mixtures of alkali metal silicides may be used as the alkali metal silicide in the invention. Included within such mixtures are combinations of alkali metal silicides as well as mixed metal alkali metal silicides. That is, the alkali metal in the alkali metal silicide can be an individual metal (e.g., Ca, Na, K) or the metal can be a combination of alkali metals (e.g., Ca and Na; Na and K; Ca, Na, and K)—a mixed metal alkali metal silicide. Mixtures of all such alkali metal silicides can be used.

Alkali metal silicides, such as disclosed in U.S. Pat. No. 7,811,541, may be free-flowing granules or powders that are stable and easily handled in dry air. Alkali metal silicides do not react directly with oxygen and do not ignite, but will react with water from the atmosphere. As illustrated by the following chemical equation [1] for a sodium version ($Na_4Si_4$), alkali metal silicides react with water to produce hydrogen gas, a corresponding alkali metal silicate ($Na_2Si_2O_5$), and significant heat.

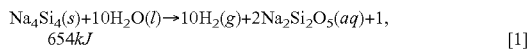
$$Na_4Si_4(s)+10H_2O(l) \rightarrow 10H_2(g)+2Na_2Si_2O_5(aq)+1,654kJ \qquad [1]$$

When used as an agent to enhance crude oil recovery, the alkali metal silicide is introduced directly to the well, where it reacts when it comes into contact with water in the reservoir pore spaces and wormholes. During the reaction, the alkali metal silicide rapidly releases hydrogen gas and heat and ultimately converts to an alkali silicate. It is this combination of reaction products that makes alkali metal silicides particularly beneficial when used either directly, or in combination, with other conventional techniques for heavy crude recovery. The wormholes and disturbed areas following CHOPS serve as highly porous high permeability open channels for transport of the alkali metal silicide deep into the formation. When the alkali metal silicide reacts, the wormholes are stimulated as hydrogen gas pressurizes the wormholes and disturbed areas, the heat reduces viscosity of the oil, and the silicate by-product reduces interfacial tension (IFT).

The alkali metal silicide reaction proceeds rapidly at any temperature or pressure and does not require a catalyst. The heat and hydrogen that is produced provide the energy and pressure to effectively displace heavier crudes. Reactivity studies have shown that alkali metal silicide generates the highest amount of hydrogen on a molar basis and has the fastest reaction rate compared to other hydrogen producing chemistries such as sodium metal in water, aluminum metal in caustic (alkaline), or silicon metal in caustic (alkaline), releasing hydrogen at a rate up to 1.49 L/min/cm². The reaction rate is a function of the surface area of the alkali metal silicide that is in contact with water, so fine powders with higher surface areas react fastest.

In one embodiment of the claimed invention, a sodium silicide may be used as the form of alkali metal silicide. A sodium silicide is used in the examples in this disclosure, although other alkali metal silicides can be used and will also perform well. For instance, the potassium alkali metal silicide can be considered where swelling clays in the smectite group, such as montmorillonite and illite, are present in the oil formation. The sodium ion tends to swell these clays, whereas the potassium ion has lesser tendency to swell and can thereby better maintain reservoir permeability and injectivity/productivity. The selection of the particular alkali metal silicide can be determined based on cost, application, environmental concerns, and the like.

Impact of Alkali Silicate

One by-product of the alkali metal silicide reaction is the corresponding alkali metal silicate produced. The alkaline silicate enhances oil recovery by reacting with the crude oil's natural acids to produce surfactants, which lower interfacial tension (IFT), alter the wettability (e.g., promote water wet surfaces for oil release), help control mobility, and improve sweep efficiency within the oil formation. Alkali metal silicide that is converted to silicate provides sufficient alkalinity to saponify crude oil acids (generally >10.5 pH), while also minimizing adverse reservoir reactions that can deplete alkalinity and inactivate the surfactants. These generated surfactants reduce interfacial tension (IFT) at the oil/water interface to allow crude oil droplets to more easily deform and flow through tight pore channels and wormholes toward a production well.

Silicates as produced from the alkali metal silicide reaction, unlike other chemicals commonly used in EOR such as sodium hydroxide, sodium orthosilicate, sodium carbonate, and the like, also provide a degree of profile modification, sweep improvement, and favorable wettability characteristics, all of which contribute to the effective release of crude oil from the sand surfaces and displacement toward a collection point. Silicates represent a spectrum of compounds ranging from very alkaline to very siliceous. Generally, lower ratio, more alkaline silicates such as ortho silicate ($2Na_2O:SiO_2$) have been used for alkaline flooding applications. The silicates produced from the alkali metal silicide reaction of the claimed invention do not plug the wormholes in post-CHOPS formations. Likewise, if there is significant hardness or multivalent cations present in the formation brine or intentionally injected, as in Mobility Controlled Caustic Flooding, the silicate by-products can react with these ions to form precipitates, which can accumulate at pore throats to block flow channels at lower concentrations and lead to more gradual conformance control and diversion of fluids to reduce fingering. These reactions can lead to gradual profile modification and reduced viscous fingering in heavy crude oil reservoirs and provide improved recovery. The particular silicate by-product resulting from alkali metal silicide is intermediate in molar ratio of silica to alkali ($Na_2O:2SiO_2$) so it provides sufficient alkalinity for reaction with crude acids while also providing a degree of flow diversion and sweep improvement through profile control.

Impact of Hydrogen

The hydrogen that evolves from the alkali metal silicide reaction is a non-toxic gas and, if desired, can be burned in the field as a fuel source or flared. In a post-CHOPS formation, hydrogen is minimally soluble (~25× less soluble than $CO_2$ as per Ostwald coefficients) in crude oils, but does contribute to viscosity reduction. As an example, $H_2$ solubility in an Athabasca vacuum bottom was measured at between 0.021 moles $H_2$/kg liquid/MPa at 130° C. to 0.034 moles $H_2$/kg liquid/MPa at 186° C. In water or brine, hydrogen solubility as a function of temperature and pressure is also low, and has a value of 0.0016 g $H_2$/kg water at 20° C. and 1 atm. As a result, the bulk of the hydrogen generated when practicing a method of the invention remains as an immiscible gas phase. The rapid generation of hydrogen, along with the impact of the silicates, discussed above, contributes to a viscous oil foam phase that effectively displaces the crude oil by raising the pore pressure, re-establishing oil flow within a post-CHOPS formation and forcing the crude oil toward a collection point. Also, the hydrogen may be able to be used to react with and reduce the formation's sand surface to alter the wettability characteristics towards more water wet pushing the entrained oil into the more mobile phase.

Alkali metal silicide has been observed to generate hydrogen pressure in confined spaces in excess of 10,000 psi, so the reaction rate is limited only by the availability of water. Since 1 mole of alkali metal silicide generates 10 moles of hydrogen gas, a relatively small, but concentrated, slug of injected alkali metal silicide can create a significant volume of gas to provide displacement energy and pressure.

Impact of Heat

The alkali metal silicide reaction also generates significant heat, which helps lower oil viscosity in the post-CHOPS oil-bearing formation. As is known in the art, crude oil viscosity decreases in a nearly logarithmic manner as a function of temperature and depends on API gravity and other factors. This is why steam injection and other thermal techniques are often effective in EOR processes other than in post-CHOPS oil-bearing formations. While steam application for recovery of low grade heavy oils generally involves the combustion of natural gas or other high value hydrocarbons to generate steam, which contributes to greenhouse gas emissions, the heat and hydrogen generated by the alkali metal silicide reactions of the claimed invention do not require combustion and do not contribute to greenhouse gas emissions at all. The alkali metal silicide reactions of the claimed invention employ much more environmentally-friendly methods for generating heat downhole. Steam techniques are limited by reservoir depth and pressure as a result of the lack of phase boundaries beyond the critical point of water. As a result, steam techniques are often limited to depths less than 5,000 ft. Additionally, while steam flooding is also generally reserved for relatively thick formations greater than 50 ft to minimize heat losses to cap and underlying rock formations, the methods of the invention, in comparison, permit oil recovery from post-CHOPS formations of any thickness.

Although the amount of heat available from the alkali metal silicide reaction (at exemplary application rates) is much smaller than used in a typical steam flood, the heat is generated in situ within the wormholes of the post-CHOPS formation so there are no losses at the surface or to the well string in transit to the oil formation. All of the heat from the alkali metal silicide is released at the reaction sites, inside the wormholes and formation pores upon contact with water. This heat, combined with the gas pressure and alkali, dislodges trapped oil from the wormholes and pores and allows it to flow freely. If additional heat is required, the heat effects can be magnified by nearly a factor of three (3) times when oxygen is co-injected and the hydrogen is allowed to auto ignite and burn. When practicing the invention in this manner, the additional heat effects further reduce viscosity and can act as the primary recovery mechanism for mobilizing oil.

Additionally, some crude oil beneficiation via hydrogenation/cracking reactions can occur as a result of the hydrogen and heat that was generated. Hydrocracking occurs at temperatures of 500 to 800° F. (260 to 425° C.) and pressures of 800 to 2,500 psi or higher. This additional mechanism further lowers the heavy crude viscosity and can be evaluated in the context of what occurs at the micro-scale within a pore in the presence of clay minerals acting as natural catalysts.

Alkali Metal Silicide Delivery Methods in Post-CHOPS Formations

The combination of chemical, thermal, and immiscible gas mechanisms provided from a single chemical entity enable alkali metal silicides according to the methods of the invention to be used for enhanced oil recovery (EOR) in post-CHOPS oil bearing formation for a variety of crude oils, from moderate to very heavy (e.g. (API gravity 22 down to 10 or 1,000 to 100,000 cps. The heavier, more viscous crude oils that tend to have a high natural acid content (Total Acid Number (TAN) value) may benefit the most from the application of heat and alkali. Application of the alkali metal silicide techniques in accordance with the invention is beneficial in these situations as the alkali metal silicide is injected into wormholes of heavy oil formations that are undergoing, or have already undergone, primary CHOPS production ("post-CHOPS"). Often, the alkali metal silicide injection process will be carried out on the well after primary CHOPS production has been completed. Alternatively, the post-CHOPS alkali metal silicide injection can be introduced during primary CHOPS production (i.e., after primary CHOPS production has started but before its economic end is reached) when a significant amount of sand has been produced and a wormhole network has been generated. One measure of determining when such a wormhole network exists is to measure the cumulative sand production from the well.

The presence of wormholes makes it possible to inject sufficient quantities of alkali metal silicide deep into the heavy oil formation in a fashion that is concentrated around the wellbore but extends throughout the formation. Wormholes allow for the generated heat and hydrogen to contact heavy oil over a large surface area created by wormholes. The heat and gas generated within wormholes in the formation provides additional energy to push more oil towards the production well.

Prior to injecting an alkali metal silicide into a post-CHOPS oil-bearing formation according to the invention, reservoirs within the post-CHOPS formation can be conditioned by a hydrocarbon, or other dewatering pre-flush, to expel water from the wellbore, the near wellbore region, and/or within the wormholes. This pre-conditioning may also enhance the formation, or the collapse, of wormholes to increase penetration of the alkali metal silicide and facilitate higher levels of oil and/or sand production. Reactive fluids, such as strong bases or strong acids and diluents or solvents like $CO_2$ can be injected to fracture or disturb the cohesive forces in the formation to enhance the creation of wormholes and thereby stimulate oil production. Prior to, or subsequently, injecting an alkali metal silicide according to the invention, the reservoir may also be re-pressurized by operations known in the art such as the injection of a hydrocarbon or of a gas.

Sodium silicide is a solid with density of 1.7 g/cc and a Mohs hardness of approximately 3.5. Therefore, to inject and deliver the alkali metal silicide into a reservoir formation, it is reduced in size to where it can effectively penetrate a porous media. An alkali metal silicide may be injected into a post-CHOPS oil-bearing formation as a coated powder or slurried in a carrier fluid. Such alkali metal compositions are described in US published patent application no. 2014/0196896 A1. In one embodiment, the alkali metal silicide injected in accordance with the invention are dispersed and/or suspended in an appropriate non-aqueous medium to form an alkali metal silicide dispersion. Alkali metal silicides can be readily wet or dry milled to submicron size via mechanical means. Many inexpensive non-reactive hydrocarbons can be used for the carrier fluid, including, but not limited to, mineral oil, kerosene, diesel, and naphtha. A medium to light native crude oil can also be used to reduce costs after it has been dewatered. Such hydrocarbon carrier fluids secondarily act as diluent solvents to further reduce the heavy crude oil viscosity in the formation. Suitable dispersions of up to 80% solids have been prepared in paraffinic mineral oil, kerosene, diesel oil, and a light crude oil. Some short-chain alcohols are not acceptable for the carrier fluid since the —OH end group can be cleaved by the alkali metal silicide similarly to water, although at a reduced rate compared to water. For stability and suspension purposes, a small amount of a non-ionic surfactant or hydrocarbon soluble polymer can be added to reduce settling tendency and to facilitate re-dispersion. Also, thickeners, such as fumed silica among others, can be added to increase formulation viscosity to retard settling. Such additives can then contribute to interfacial tension (IFT) reduction and mobility improvements in the formation.

In one embodiment for use in a method of the invention, an alkali metal silicide in oil dispersion is prepared in diesel oil with a maximum particle size of about 20 to 25 microns. A large fraction of the particles are submicron. To prepare this dispersion, sodium silicide, $Na_4Si_4$, ingots were dry crushed and then wet milled to achieve the final particle size dispersion using grinding techniques known in the art. This dispersion may then be further diluted with additional diesel and either a non-ionic surfactant or viscosity modifier to reduce settling tendency and aid in re-dispersion. Non-ionic surfactants and viscosity modifiers known in the art may be used but should be compatible with the alkali metal silicide. Other factors known in the art for selecting a particular non-ionic surfactant or viscosity modifier include solubility in the dispersant, melting point, HLB value, etc.

In a reservoir environment, higher permeability formations (>1 Darcy) are often targeted, such as unconsolidated sands or fractured carbonate formations with high permeability vugs and channels. This allows for the injection of a solid dispersion without appreciable face plugging. Formations of less than a Darcy can form surface blockage at the well interface as solid material bridges the pores, if the alkali metal silicide is too large, and deposits causing injectivity to be lost over time. The wormholes remaining after CHOPS production provide a desirable pathway for injection of an alkali metal silicide dispersion deep into the formation and do not require a tight range of particle sizes. The only limitation on the amount of alkali metal silicide in dispersion is the dispersion's ability to be injected into a post-CHOPS oil-bearing formation. Generally speaking, alkali metal silicide dispersions having loadings from about 15 to about 80 wt % may be used. In other embodiments, 20-50 wt. % dispersions or dispersions of 25 wt. %, 30 wt. %, 35 wt. % or 40 wt. % may be used.

Alkali Metal Silicide Reaction Process

To avoid premature reaction as the alkali metal silicide is injected into a post-CHOPS oil-bearing formation, a method of the invention will first flush the well-bore and may also flush the near wellbore region to expel water from the wellbore and the near wellbore region. This may be accomplished by circulating either a hydrocarbon void of silicide or a gas down the tubing and out the casing annulus, or alternately circulating down the annulus and back through the tubing, or alternately by injecting down the annulus or tubing into the wormholes and reservoir, to remove any resident fluids containing water or water reactive components. It is not necessary to expel all water from the wellbore or the near wellbore region but it is preferable that no significant amount of alkali metal silicide react in the wellbore or the near wellbore region during the injection step. Flushing the wellbore may be part of the preflush of a post-CHOPS formation to enhance the formation of wormholes to increase production, as discussed above.

When the bulk of the alkali metal silicide reaction is delayed to occur deep within the producing formation where it comes into intimate contact with water and the resident crude oil, then oil recovery is maximized. To affect the proper delivery of the alkali metal silicide, an alkali metal silicide injection slug can be prepared in accordance with the claimed invention. As discussed above, the alkali metal silicide injection slug can include a coated powder, a carrier for such powders, or in one embodiment an alkali metal silicide dispersion, e.g., an alkali metal silicide powder dispersed in a hydrocarbon carrier fluid. Alkali metal silicides can be delivered to the reservoir in several ways. It can be injected in a flooding mode with dedicated injection wells and production wells serving in the post-CHOPS oil-bearing formation, where the alkali metal silicide contacts water and oil in the reservoir matrix, such as in consolidated reservoirs. More commonly in post-CHOPS formations, alkali metal silicide can be injected in a cyclic manner, such as a huff and puff method, into the wellbore of producing wells with short injection periods followed by a short soak and prolonged production periods, where the alkali metal silicide contacts water and oil either in the reservoir matrix or in wormholes of the unconsolidated reservoir formation.

After injecting alkali metal silicide into a post-CHOPS oil-bearing formations, the alkali metal silicide may be reacted with, for example, in situ water present in the formation and/or wormholes, or with injected water or alcohol. Other liquid reactants/compositions capable of reacting with the alkali metal silicide may be used. The injected water or alcohol may be supplied from the same or a different well as the injected alkali metal silicide. Reacting the alkali metal silicide stimulates oil production by at least one of formation pressure increase, oil viscosity reduction, interfacial tension (IFT) alteration, wettability alteration, wormhole collapse and regrowth, fluid diversion, and sweep improvement. In other embodiments of the invention, the step of reacting the injected alkali metal silicide to stimulate oil flow within the post-CHOPS oil-bearing formation may be done in combination with at least one separate step of water injection, gas injection, steam injection, solvent injection, thermal heating of the oil bearing formation, or chemical treatment of the post-CHOPS oil-bearing formation.

FIG. 1 shows a mechanistic example of the claimed method of alkali metal silicide introduction in a cyclic configuration, such as in a huff and puff system, for example. Likewise, the claimed invention can be used in a flooding mode as well. A silicide dispersion 101 is injected down the annulus 155 of a well completed with tubing 143 and a casing (not numbered), such as a downhole progressive cavity pump 110. The silicide dispersion 101 travels down the annulus 155 and into wormhole network 166. Water is likely to be present in the wormhole network 166 and in the immediate vicinity of the target crude oil (as a result of conate water present in the formation and free water produced in conjunction with oil during primary CHOPS production). In addition to the actual silicide dispersion 101, a preflush of hydrocarbon or gas 107 can be used to displace as much of this resident water as possible from the wellbore 177 and the wormholes 166 to ensure maximum penetration. An example injection slug sequence is shown in FIG. 1. Often, a pure hydrocarbon (without alkali metal silicide) preflush 107 is performed, and the alkali metal silicide 101 is injected after the preflush. Light hydrocarbons are preferable since they then act as a diluent for the heavy crude oil to further the viscosity reduction effect. Additives such as polmers may be incorporated in the preflush to improve flush efficiency. Also, a gas such as methane, propane, air, nitrogen, oxygen, carbon dioxide, etc. could be used to displace any aqueous fluids from the wellbore or annulus of a CHOPS well prior to alkali metal silicide injection. The hydrocarbon preflush 107 can also push water through the wormholes 166 into the formation before it returns with reduced viscosity into the wormhole network as a result of the ensuing pressure increase. This preflushing serves to "dry" the wormhole delivery path in advance of the alkali metal silicide injection slug 101 allowing the alkali metal silicide to penetrate more deeply in the formation before encountering significant water and being consumed. In the reservoir formation, it is in this preflush area where the mixing of alkali metal silicide and water is occurring to generate the heat, hydrogen, and silicate by-products. For heavier crude oils, this preflush 107 also serves as a suitable solvent, or diluent, to further improve oil mobility.

Similarly, on the back end of the alkali metal silicide slug 101, a short postflush slug 109 of hydrocarbon or gas can be used to clear the wellbore of alkali metal silicide dispersion (from alkali metal silicide injection slug 101) and to isolate it as much as possible from any aqueous-based drive fluids that follow, such as brine or polymer thickened water 111. This can also add pressure to the formation. In the cyclic case, a short slug of water may follow the postflush to ensure all the silicide has reacted during the soak period before returning the well to production. As was the case with the preflush, the postflush slug 109 can also be pure hydrocarbon or gas. In this way, as the alkali metal silicide slug 101 advances into the formation, there may be reaction both at the front in the hydrocarbon preflush 107 area and at the rear in the hydrocarbon postflush 109 area of the alkali metal silicide slug 101 as natural fluid dispersion in the porous matrix of the formation creates the opportunity for contact with water. The hydrocarbon postflush 109 provides additional benefits because a fast reaction on the back end may rapidly propel the unreacted alkali metal silicide slug 101 ahead through the wormholes and deep into the formation and accelerate its contact with water on the front end, allowing it to rapidly expend itself in a shorter period of time with a consequent pressure and temperature spike. Oil, water and sand 188 are produced to the surface via tubing 143.

For heavier crudes and particularly for post-CHOPS wells, alkali metal silicides can be employed in a cyclic (e.g., huff and puff/huff and puff) mode with injection and production from the same well, at least initially. As outlined above, FIG. 1 depicts a typical CHOPS well with wormhole network into which alkali metal silicide treatments are applied in a cyclic manner. FIGS. 6A-6C show another example CHOPS well utilizing a cyclic method for producing oil, such as a huff and puff method. For example, as shown in FIG. 6A, an alkali metal silicide dispersion is injected down the annulus 808 of a post-CHOPS well (huff) for one to several days. As shown in FIG. 6B, once the alkali metal silicide dispersion is injected down the annulus, a short soak period allows the reaction to proceed to completion and heat is dissipated in the formation 818 as the alkali metal silicide dispersion reacts. FIG. 6C illustrates the well returned to production for several months as oil is produced up the central tubing 828 via the progressive cavity pump. This cycle is similar to a cyclic thermal enhanced oil recovery (EOR) process. In a cyclic mode, the pure hydrocarbon spacer slugs may be very short or may not be needed since the objective is the near wellbore and wormhole area crude oil. In some cases, cyclic huff and puff injections may be converted to flood mode after several cycles once communication has been established between adjacent wells.

The alkali metal silicide is injected into the post-CHOPS well at a selected injection pressure and a selected injection temperature. The selected injection temperature will be at or about the same as the reservoir temperature (about 15° C., for example, which is typical for western Canada oilfields). The selected injection pressure should be greater than the reservoir pressure and should be sufficient to cause the alkali metal silicide to flow easily into the reservoir and into wormholes in the formation. Generally speaking, the injection pressure should typically be below the formation fracturing pressure of the reservoir.

After the selected amount of the alkali metal silicide and any other complimentary EOR materials (chemicals, gases, additives, polymers, etc.) have been injected into the well, the well can be shut in for a selected period of time, to allow the alkali metal silicide and water/alcohol reaction to take place within the wormholes. After the shut-in period has been completed, the well is then put on production and oil and gas is produced. The well can be produced in a similar fashion as a conventional CHOPS well with progressive cavity pumps during primary CHOPS production.

Extending CHOPS Efficacy

Another scenario in which an alkali metal silicide can be delivered deeply into a formation is following where Cold Heavy Oil Production with Sand (CHOPS) has been previously employed, but is approaching or has reached its economic limit. Solution gas drive, or solution gas drive in combination with aquifer support, has been the main mechanism for CHOPS production. Reservoirs that do not initially contain free gas, but develop free gas on pressure depletion, use the same mechanism once the pressure falls below the point where gas begins to break out of an undersaturated oil and form a free gas phase (bubblepoint). The CHOPS technique often creates wormholes in the weaker sand channels within the formation from which the unconsolidated sand and oil has been produced. This leaves behind high permeability channels that allow the alkali metal silicide ready access to the interior parts of the formation away from the wellbore. The higher permeability channels act as uncased horizontal wells where the alkali metal silicide can flow and react to release heat to reduce crude oil viscosity, release hydrogen to restore reservoir pressure, and release alkali to stimulate additional production. In this example shown in FIGS. 6A-6C, the alkali metal silicide can be applied in a cyclic manner with injection and production from the same well.

Not all injected particles of alkali metal silicide (e.g., $Na_4Si_4$) in a diesel solution may react instantly with water from the formation. Some fraction of the injected $Na_4Si_4$ may react instantly, and the rest can react slower, depending on the dispersion rate of the alkali metal silicide within the wormholes. Multiple cases were run to investigate the effect of $Na_4Si_4$ dispersion rates on the cyclic post-CHOPS process. A 30 wt. % $Na_4Si_4$ dispersion in diesel oil, prepared as described above, was used in the studies reported below.

Figure 7:
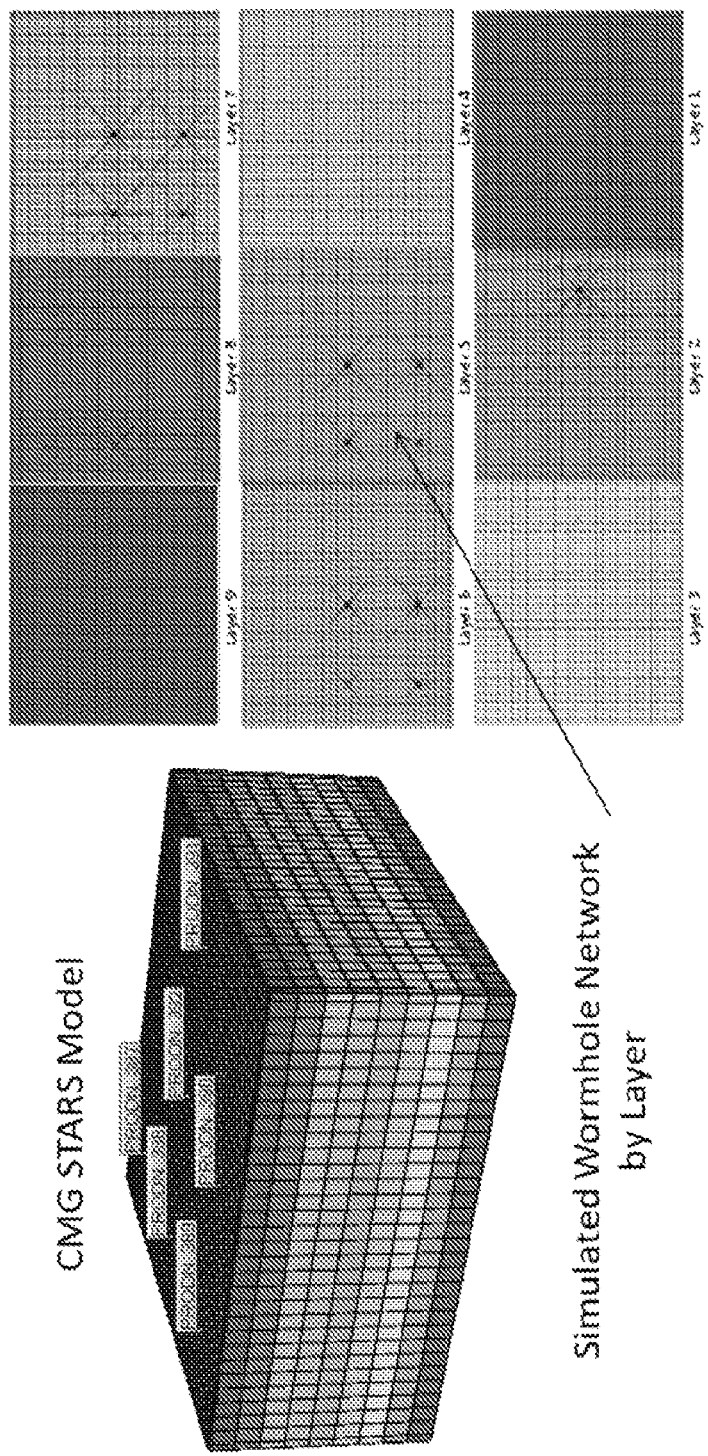
FIG. 7 shows the CMG Stars numerical layers with well pattern and spoke like placement of wormholes around the wells that history matches the actual field performance.

The CMG STARS advanced processes and thermal reservoir simulator (Computer Modelling Group, Ltd.) was used to model and confirm the post-CHOPS alkali metal silicide injection process for an actual six CHOPS wells pattern in Canada by considering the pressure maintenance and solubility effects of the hydrogen reaction product, the heat effect from the reaction, and the diluent effect of the diesel solvent carrier fluid. The alkali effect was not taken into consideration in the model. FIG. 7 shows the layers of the model with well pattern and placement of the wormholes in a spoke like pattern in the different layers that historically match the prior CHOPS production. Although the spoke like pattern is likely not realistic of the actual wormhole pattern, it does provide a reasonable basis for the history match and subsequent prediction of cyclic alkali metal silicide application in the system. No IFT reduction or sweep improvement contributions were incorporated from the silicate by-product or by any mechanism for wormhole collapse and regrowth to improve recovery. The oil was an 11.6 API gravity, 20,575 cps heavy crude at 15° C. The results in Table 1 show that when 30 wt. % alkali metal silicide dispersion in a diesel carrier fluid is applied at rates between 1.5 to 20 m³/cycle in a cyclic process with a sequence of 1 day injection, 1 day soak and 30 to 120 days production over 15 to 30 cycles, that the recovery factor from such wells can be economically increased by 50% over primary CHOPS recovery alone. Pressure maintenance in the near wellbore area and viscosity reduction as a result of the heat, hydrogen solubility, and solvent effects contributed to this increase.

TABLE 1

% IOIP Recovery for Different Schemes

| Schemes | Oil Recovery, % IOIP | Water Recovery, % IWIP |
|---|---|---|
| Injection Rate = 10 m³/day/well of Solution Injection | | |
| 2 days Inj + 1 day soak + 60 days prod | 2.08 | 0.41 |
| 3 days Inj + 1 day soak + 60 days prod | 2.36 | 0.39 |
| 4 days Inj + 1 day soak + 60 days prod | 2.59 | 0.36 |
| 2 days Inj + 1 day soak + 90 days prod | 1.88 | 0.43 |
| 3 days Inj + 1 day soak + 90 days prod | 2.10 | 0.41 |
| 4 days Inj + 1 day soak + 90 days prod | 2.29 | 0.39 |
| 2 days Inj + 1 day soak + 120 days prod | 1.76 | 0.44 |
| 3 days Inj + 1 day soak + 120 days prod | 1.94 | 0.43 |
| 4 days Inj + 1 day soak + 120 days prod | 2.10 | 0.41 |
| Injection Rate = 20 m³/day/well of Solution | | |
| 1 day Inj + 1 day soak + 60 days prod | 2.10 | 0.41 |
| 2 days Inj + 1 day soak + 60 days prod | 2.64 | 0.35 |
| 3 days Inj + 1 day soak + 60 days prod | 3.09 | 0.32 |
| 1 day Inj + 1 day soak + 90 days prod | 1.89 | 0.43 |
| 2 days Inj + 1 day soak + 90 days prod | 2.31 | 0.39 |
| 3 days Inj + 1 day soak + 90 days prod | 2.66 | 0.35 |
| 1 days Inj + 1 day soak + 120 days prod | 1.76 | 0.44 |
| 2 days Inj + 1 day soak + 120 days prod | 2.12 | 0.41 |
| 3 days Inj + 1 day soak + 120 days prod | 2.42 | 0.37 |
| Injection Rate = 30 m³/day/well of Solution | | |
| 1 days Inj + 1 day soak + 60 days prod | 2.40 | 0.38 |
| 2 days Inj + 1 day soak + 60 days prod | 3.10 | 0.31 |
| 1 days Inj + 1 day soak + 90 days prod | 2.12 | 0.40 |
| 2 days Inj + 1 day soak + 90 days prod | 2.67 | 0.34 |
| 1 days Inj + 1 day soak + 120 days prod | 1.95 | 0.42 |
| 2 days Inj + 1 day soak + 120 days prod | 2.42 | 0.37 |

Oil Production Rates

Figure 2:
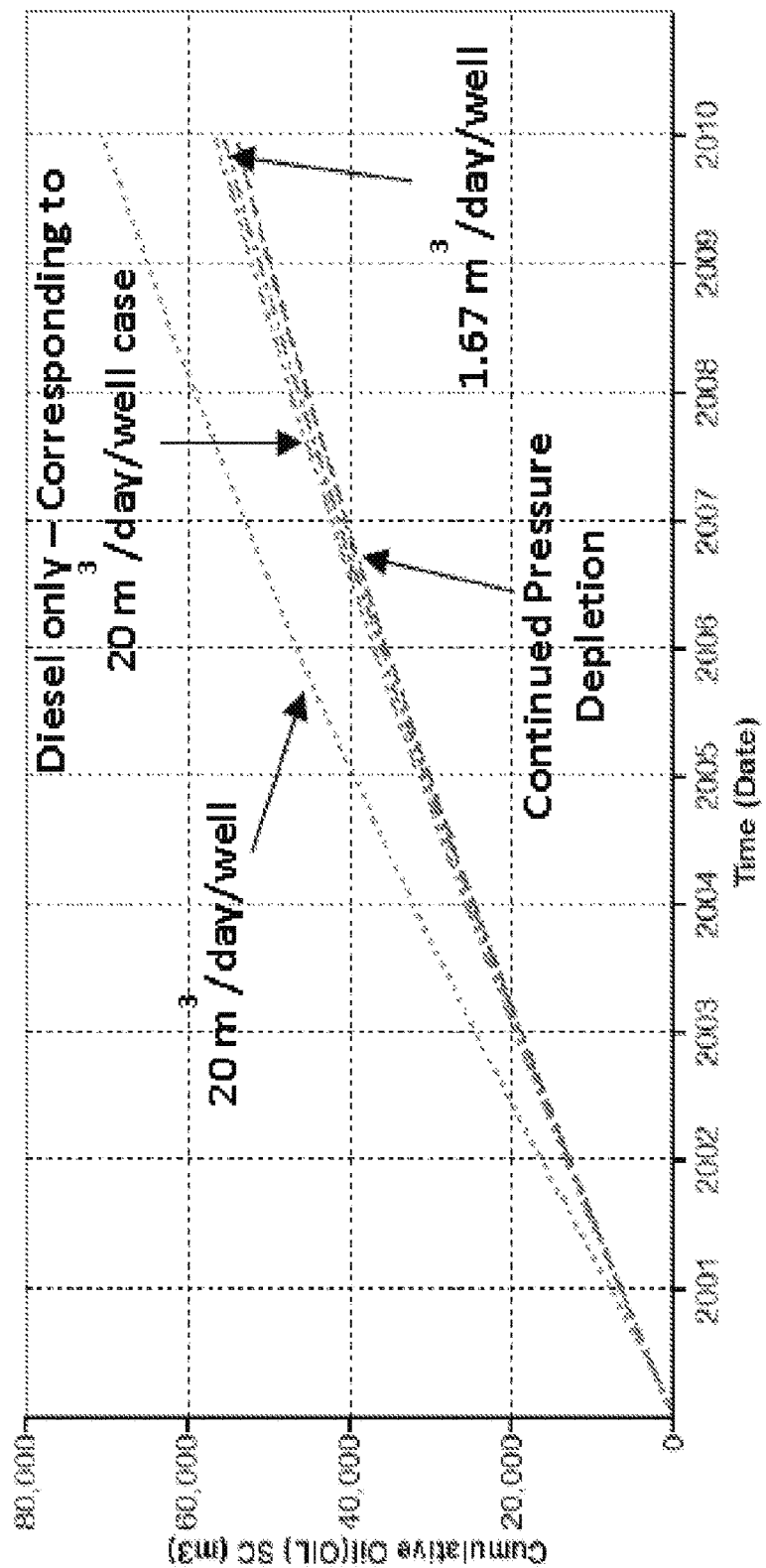
FIG. 2 Comparative Alkali metal silicide and Diesel Solvent Simulations Over 30 Cycles.

FIG. 2 further shows simulated production curves for several cases that compare different alkali metal silicide application rates to a case using pure diesel without alkali metal silicide. The pure diesel without alkali metal silicide represents a base case solvent effect. The results show that the alkali metal silicide application results in significant additional recovery over just the solvent effect of the diesel carrier fluid. As shown in FIG. 2, among the four cases, the 20 m³/day injection resulted in the highest oil production, of 70,637 m³ of oil (2.94% OOIP recovery). The lowest alkali metal silicide injection rate of 1.67 m³/day well gave 55,842 m³ of oil (2.33% OOIP recovery). The pure diesel injection resulted in 56,798 m³ of oil (2.37% OOIP recovery) and the continued pressure depletion produced 54,229 m³ of oil (2.26% OOIP recovery). In terms of percentage increase, the 20 m³/day/well alkali metal silicide injection rate improved oil recovery by ~27% over the 1.67 m³/day/well injection case, by ~25% over the pure diesel injection case, and by ~30% over the continued pressured depletion case. In actual field operation a continued pressure depletion case would not occur as the well would be left to its own production.

Viscosity Reduction

Figure 3:
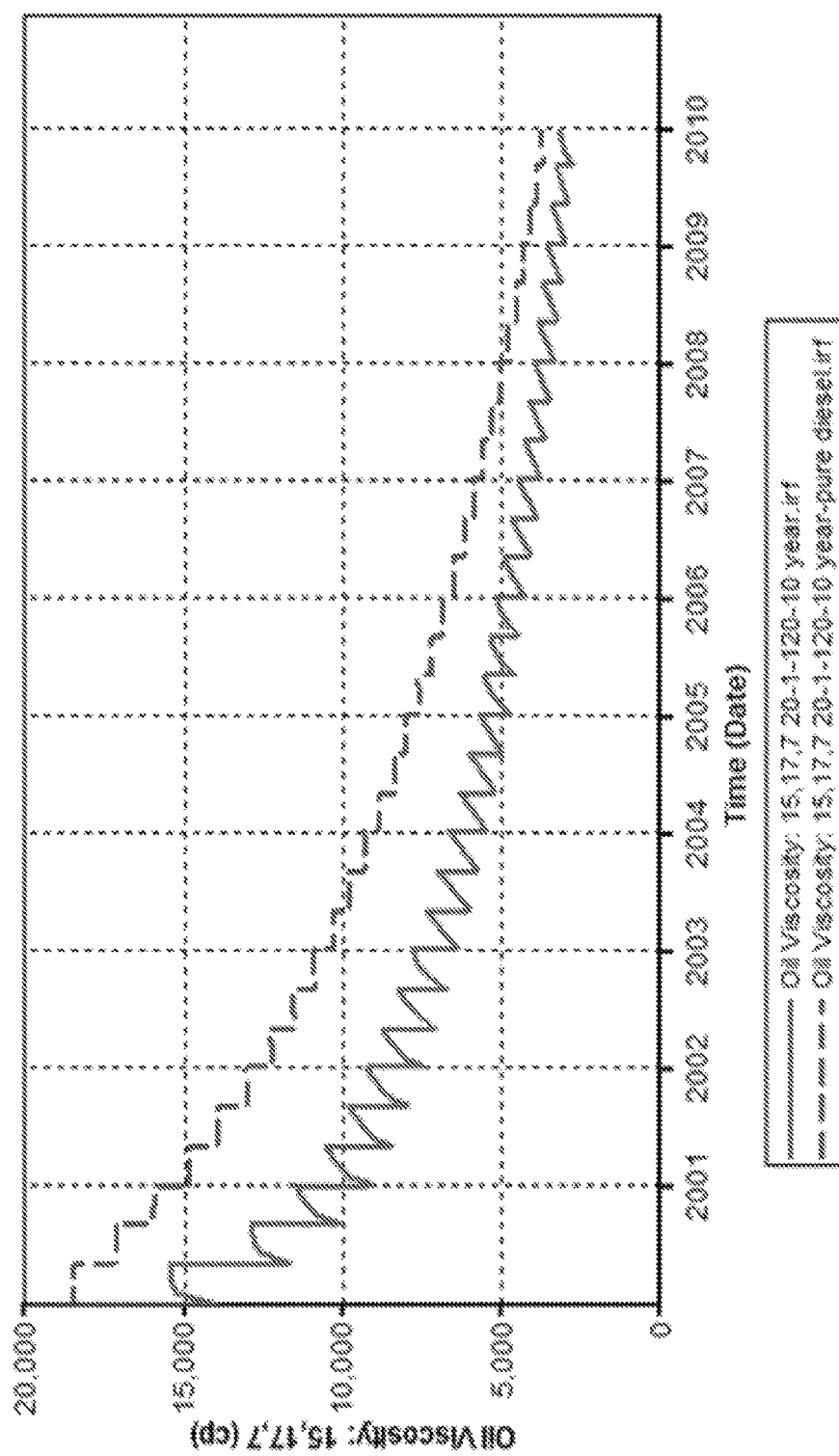
FIG. 3 Oil Viscosity Reduction—Alkali metal silicide in Diesel vs Diesel Alone.

This improvement is further illustrated by the viscosity reduction effect of diesel alone versus alkali metal silicide in a diesel carrier fluid as shown in FIG. 3. Viscosity reduction improves oil mobility as the oil flows more freely. Reduced viscosity can be attributed to a number of factors including hydrogen solubility in the oil phase, heat from the alkali metal silicide reaction, and diesel solvent dilution effects. By comparing alkali metal silicide in diesel cases to diesel only cases at an injection rate of 20 m³/day/well, the factors can be separated out over time and shown for a block closest to the wellbore. Both the alkali metal silicide and diesel only cases resulted in more than 75% reduction in crude oil viscosity after 10 years, but as shown in FIG. 3 alkali metal silicide provides a larger reduction, particularly in the early cycles. In both cases, the diesel fraction in the produced oil is low initially but gradually builds over time making up nearly 1% of the cumulative production (400 m³) after about 5 years. This affects the shape of the viscosity reduction curves (FIG. 3) to which are added the cyclic alkali metal silicide effects. The trend shows a quick drop in viscosity immediately upon reaction and the release of heat and hydrogen. Viscosity then recovers slightly as fluids are produced back during the production phase. Also, some heat and hydrogen are dissipated and/or accumulated in the formation, which builds over time with each added cycle. The differences between the hydrogen solubility and heat effects from the alkali metal silicide may not be easily separated based upon the model, but the hydrogen solubility effect may be larger, since the formation is a significant heat sink.

Figure 4A:
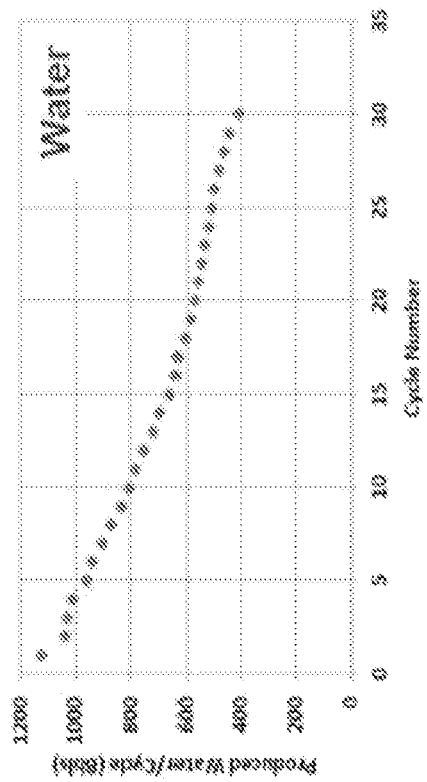
FIGS. 4A-4C show production Curves for Oil (A), Water (B) and Gas (C) for the Case of a 7.35 m$^3$/cycle/well Alkali metal silicide Injection.
Figure 4B:
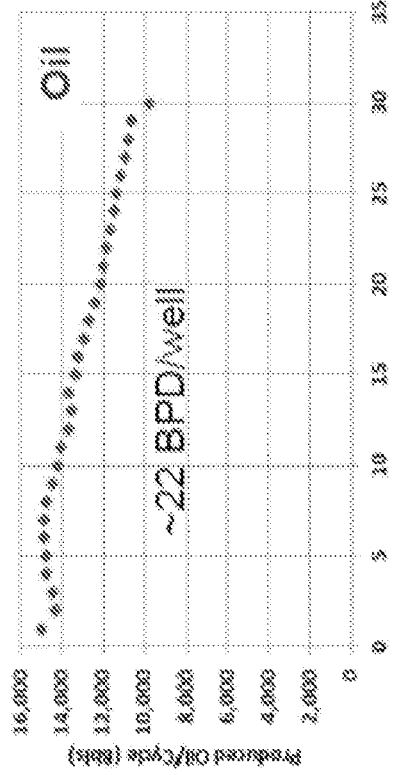
Figure 4C:
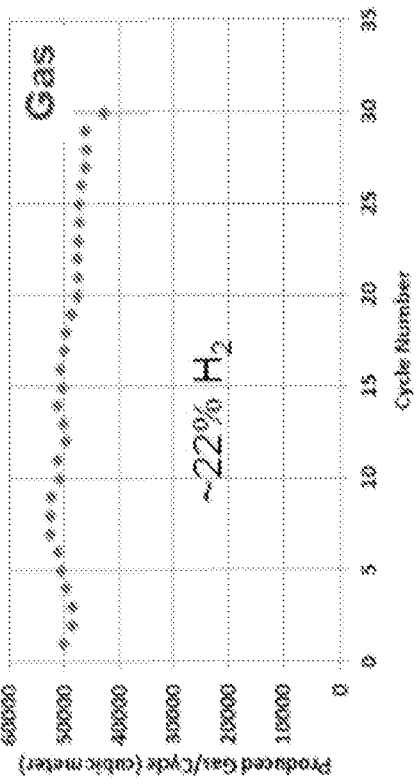

Water production from such wells is reduced as a result of water consumption by the alkali metal silicide reaction, which then reduces water handling expenses related to the produced fluids. FIGS. 4A-4C show the simulated production curves for the oil (FIG. 4A), water (FIG. 4B) and gas (FIG. 4C) for the example where an alkali metal silicide application rate of 7.35 m³/well/cycle is injected over a 1 day period with a 1 day of soak and 120 days of production for up to 30 cycles over 10 years.

The model also indicates that wells that were not necessarily the best producers during primary CHOPS production are now producing more of their oil. For instance, as shown in Table 2, wells 391 and 392 that were ranked 3$^{rd}$ and 4$^{th}$ during primary CHOPS production were now the top producing wells under post-CHOPS cyclic alkali metal silicide treatment. This was for an injection sequence of 20 m³ injection over 1 day with a 1 day soak and 120 days production. It appears that the alkali metal silicide effects are reaching additional parts of the reservoir via the wormhole network created during primary CHOPS production. These portions of the reservoir were not previously accessible.

TABLE 2

Comparison of CHOPS and post-CHOPS Production Wells

| Well | Primary CHOPS Oil (m³) | (%) | Rank | Post CHOPS - Cyclic Alkali Metal Silicide Treatment Oil (m³) | (%) | Rank | % of Primary |
|---|---|---|---|---|---|---|---|
| 387 | 4,585 | 3.28% | 6 | 4,480 | 6.40% | 6 | 97.7% |
| 388 | 29,982 | 21.42% | 2 | 11,398 | 16.28% | 4 | 38.0% |
| 389 | 12,346 | 8.82% | 5 | 8,064 | 11.52% | 5 | 65.3% |
| 390 | 37,037 | 26.46% | 1 | 12,652 | 18.07% | 3 | 34.2% |
| 391 | 26,596 | 19.00% | 4 | 17,706 | 25.29% | 1 | 66.6% |
| 392 | 29,417 | 21.02% | 3 | 15,699 | 22.43% | 2 | 53.4% |
|  | 139,963 | 100.00% |  | 69,999 | 100.00% |  | 50.0% |

Comparison of Alkali Metal Silicide and Diesel to Cyclic Solvent Injections

A competing technology for post-CHOPS wells is Cyclic Solvent Injection (CSI) where the solvent includes mixtures of light hydrocarbons such as methane, ethane, and propane. An example test was simulated with the CMG STARS model where a 70% methane/30% propane solvent mixture was applied in a cyclic manner at 60 days injection, 15 days soak, and 290 days production at an equivalent rate based on the same material cost as the alkali metal silicide. The results are shown in FIGS. 5A-5B for two cases of solvent priced at $3/sm³ (low purity) and $8.4/sm³ (high purity). FIG. 5A compares the performance of alkali metal silicide and diesel with solvent injections in terms of cumulative oil production. Likewise, FIG. 5B compares the performance of alkali metal silicide and diesel with solvent injections in terms of cumulative water production. In both cases the alkali metal silicide method is more cost effective at producing additional oil (~23% more oil) than the solvent mixture over 5 years of cyclic operation. The alkali metal silicide and diesel case also results in less water production (~8% less water).

Cyclic injection of sodium alkali metal silicide in a post-CHOPS reservoir can improve the recovery of original, or initial, oil in place. The increase is due to near wellbore/wormhole re-pressurization from hydrogen generation, and viscosity reductions due to dissolved hydrogen gas, and temperature increases near the wellbore/wormhole. No allowance is made in the CMG STARS model for IFT reduction, wettability changes, sweep improvement, or wormhole collapse effects, which are all likely additional mechanisms to further improve the recovery factor.

The claimed invention is:

1. A method of stimulating oil recovery from an unconsolidated oil sand matrix in a post-cold heavy oil production with sand (CHOPS) oil-bearing formation, the method comprising:
    flushing a wellbore in an unconsolidated oil sand matrix in a post-CHOPS oil-bearing formation having at least one wormhole to expel water from the wellbore and near wellbore region;
    injecting an alkali metal silicide dispersion into the at least one wormhole in the unconsolidated oil sand matrix in the post-CHOPS oil-bearing formation;
    injecting water or alcohol into the at least one wormhole to react with the injected alkali metal silicide dispersion to stimulate oil flow within the unconsolidated oil sand matrix in the post-CHOPS oil-bearing formation; and
    recovering sand and oil from the unconsolidated oil sand matrix in the post-CHOPS oil-bearing formation.

2. The method of claim 1, wherein the alkali metal silicide dispersion contains about 20 to about 80 wt. % alkali metal silicide.

3. The method of claim 1, wherein the alkali metal silicide in the alkali metal silicide dispersion is a sodium silicide.

4. The method of claim 3, wherein the alkali metal silicide is $Na_4Si_4$.

5. The method of claim 1, wherein the alkali metal silicide dispersion comprises a hydrocarbon carrier fluid.

6. The method of claim 1, wherein the reaction of the injected alkali metal silicide dispersion with water or alcohol generates hydrogen, silicate, and heat within a portion of the unconsolidated oil sand matrix in the post-CHOPS oil-bearing formation.

7. The method of claim 1, wherein the unconsolidated oil sand matrix in the post-CHOPS oil-bearing formation contains medium to heavy crude oils having an API gravity of 10 to 22 or 1,000 to 100,000 cps.

8. The method of claim 1, wherein injecting the alkali metal silicide dispersion into the unconsolidated oil sand matrix in the post-CHOPS oil-bearing formation comprises injecting the alkali metal silicide dispersion via an injection well and recovering sand and oil from a production well in the unconsolidated oil sand matrix in the post-CHOPS oil-bearing formation.

9. The method of claim 1, wherein injecting the alkali metal silicide dispersion into the unconsolidated oil sand matrix in the post-CHOPS oil-bearing formation comprises injecting the alkali metal silicide dispersion via a production well in the unconsolidated oil sand matrix in the post-CHOPS oil-bearing formation.

10. The method of claim 1, wherein reacting the injected alkali metal silicide dispersion comprises the step of injecting water into the unconsolidated oil sand matrix in the post-CHOPS oil-bearing formation.

11. The method of claim 1, wherein the reaction of the injected alkali metal silicide dispersion with water or alcohol stimulates oil production by at least one of formation pressure increase, oil viscosity reduction, interfacial tension (IFT) alteration, wettability alteration, wormhole collapse and regrowth, fluid diversion, and sweep improvement.

12. The method of claim 1, wherein the reaction of the injected alkali metal silicide dispersion with water or alcohol to stimulate oil flow within the unconsolidated oil sand matrix in the post-CHOPS oil-bearing formation is done in combination with at least one separate step of water injection, gas injection, steam injection, solvent injection, thermal heating of the unconsolidated oil sand matrix in the post-CHOPS oil-bearing formation, or chemical treatment of the unconsolidated oil sand matrix in the post-CHOPS oil-bearing formation.

13. The method of claim 1, wherein the step of injecting an alkali metal silicide dispersion and the step of injecting water or alcohol are repeated in a cyclical manner to stimulate oil flow within the unconsolidated oil sand matrix in the post-CHOPS oil-bearing formation.

14. The method of claim 13, wherein the cyclical manner to stimulate oil flow within the unconsolidated oil sand matrix in the post-CHOPS oil-bearing formation comprises alternating injection, soak, and recovery periods in a single well used for both injection and production.

15. The method of claim 1, wherein injecting the alkali metal silicide dispersion comprises the additional step of injecting a hydrocarbon spacer fluid to promote deep penetration.

16. The method of claim 15, wherein the injection of the hydrocarbon spacer fluid includes at least one of a preflush and a postflush fluid.

* * * * *